Dec. 28, 1954  M. R. POLLARD, JR  2,698,195
SHAFT SEAL
Filed Feb. 7, 1950
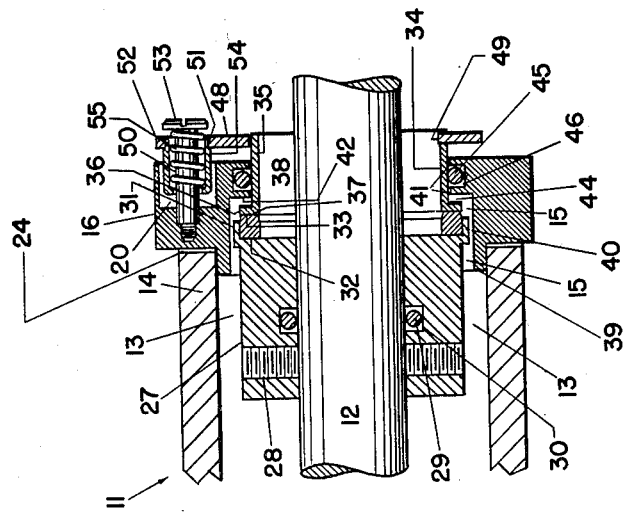
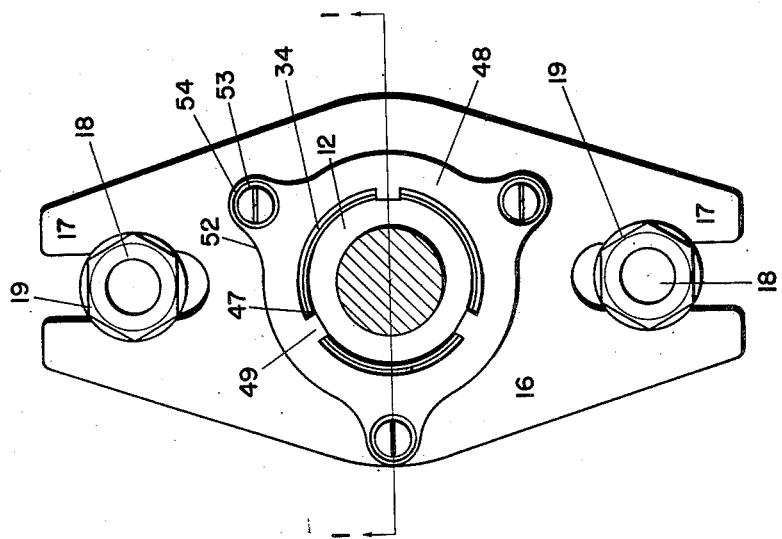
INVENTOR.
MELVILLE R. POLLARD, JR.
BY George R Bliss

2,698,195

Patented Dec. 28, 1954

2,698,195

SHAFT SEAL

Melville R. Pollard, Jr., Encino, Calif., assignor, by mesne assignments, to Jet Shaft Seals, Inc., Los Angeles, Calif., a corporation of Arizona Application February 7, 1950, Serial No. 142,854

2 Claims. (Cl. 286—11.14)

This invention relates to shaft seals for use in preventing fluid leakage from fluid chambers along the joint or clearance between the chamber wall and a relatively rotating shaft, as for example between a centrifugal pump housing and the shaft therefor.

The invention particularly relates to shaft seals comprising a stationary seal housing attachable to the pump housing, two sealing elements, one of which is non-rotatively mounted within or on the housing, and the other of which is mounted on the shaft to rotate therewith, the two elements having slidably engaging radially extending sealing surfaces which are not parallel to the shaft axis, and means for urging one of the elements into pressural engagement with the other element.

In this type of shaft seal, one of the sealing elements is movable slightly within the seal housing in a direction parallel to the shaft axis to effect a pressural seal between the two sealing elements. The joint or clearance permitting this slight movement between the axially movable element and either the seal housing or the shaft as the case may be, must be sealed to prevent fluid leakage. The other sealing element which is mounted so as to be incapable of axial movement is secured to the shaft or seal housing as the case may be, in fluid tight relation therewith. In the disclosure of the invention set forth in the following specification and in the drawings, the axially movable element is mounted on the seal housing in a manner to permit such movement and is sealed from the escape of fluid by means of a sealing ring disposed between the housing and this sealing element.

In some of these seals, springs or other mechanical resilient means are used as the sole means of urging the sealing elements into pressural engagement. In others, the spaces between the seal parts are designed to apply fluid pressure from the pump or other fluid housing to the movable sealing element as the sole means of urging the sealing elements together. And in a third type of seal mechanical resilient means such as springs, and fluid pressure, are both utilized to urge and hold together the sealing elements.

The sealing pressure between the sealing elements, when supplied by the fluid pressure within the pump chamber, varies in magnitude and is roughly a function of the pump pressure, a condition which makes it possible to so design the seal that the sealing pressure may always be adequate to prevent separation of the sealing elements even at the highest pump fluid pressures occurring in any given installation, and yet always be at a minimum value for each value of the pump fluid pressure. Thus the wear of the sealing faces of the two sealing elements is reduced to a minimum.

It is apparent that if the pressure by which the sealing surfaces are held in contact is provided solely by springs and is therefore of a fixed value, it must be great enough to provide an effective seal to withstand the highest pump pressures to which the seal is subjected. It is also apparent that the sealing pressure is then much more than adequate for values of fluid pressure in the pump chamber of a centrifugal pump under starting conditions or when operating under conditions of continuous low pressure. Fluid pressure is therefore more desirable than spring pressure to provide the means for urging the sealing elements into pressural contact.

However, when the pump is idle, there may, in some installations or under some circumstances, be no fluid pressure or inadequate fluid pressure to hold the sealing surfaces in contact. The sealing surfaces must be held in contact at such times. For when the pump comes to rest after a period of operation, the residual fluid in the pump chamber must be sealed against leakage. This is particularly true when the fluid which is being handled by the pump is a liquid and especially when either the gas or liquid is of a corrosive or other destructive character. Consequently, a sealing pressure of some kind and at least of a small value, must be available for preventing the escape of fluid when the pump is idle. Also at times when due to surging within the pump an endwise movement of the shaft takes place relative to the pump housing, the sealing elements may be separated at the plane of their sealing contact. If fluid pressure is the only pressure afforded for maintaining a contact between the sealing elements, at such times as they become thus separated, the high pressure fluid will escape through the opening between the sealing surfaces of the sealing elements. After the opening between the sealing faces has been once effected, fluid will continue to flow therethrough and no matter how high the fluid pressure such pressure cannot bring the sealing faces together again against the rush of fluid through the gap between the sealing faces, and this escape flow will continue.

It thus becomes essential in the design of a shaft seal of the radial sealing surface rotary sliding contact type, utilizing fluid pressure to hold the radial sealing elements in contact, to provide a small axially directed pressure, in addition to the axially directed fluid pressure and independent thereof, which shall always be available for holding the sealing surfaces in contact at those times as when the pump is idle or when the sealing surfaces become momentarily and accidentally separated during the operation of the pump, either because of surging within the pump or from any other cause.

It is one of the objects of this invention to provide in a shaft seal of the type employing fluid pressure as the sealing force, means providing a supplementary or standby sealing force of a simple, reliable and long lived character to maintain the sealing contact when the pump is idle or to re-establish it when the sealing elements have been temporarily separated due to surging or other causes.

Longitudinally acting springs have been extensively employed to provide this supplementary standby sealing force. It is also an object of this invention to provide such longitudinally acting springs in an arrangement of the seal parts, such that the springs are not only not immersed in the fluid handled by the pump or other device, but are remote therefrom and protected from contact therewith, even though there may be some leakage from the outer end of the seal.

Another object of this invention is to provide a seal of the fluid pressure actuated type which is constructed in a novel manner to utilize the fluid pressure effectively.

It is still another object of the invention to provide a seal in which the longitudinally movable element is mounted in a free floating fashion on the seal housing in a novel manner so as to provide for fluid pressure actuation, and for a sealing means between the element and housing which will not hinder its free floating movements. It will be understood that the longitudinally movable sealing element must, for proper operation, have a free floating connection with the housing to accommodate itself to random wobble movements of the shaft to which the other seal element is fixedly secured, so that the sealing faces may be at all times flatly in contact with each other throughout their entire circular area with an evenly distributed unit area pressure to prevent uneven wear.

It is still another object to provide a seal in which the standby spring pressure means is constructed to conform to the random free floating movements of the longitudinally movable sealing element and yet to apply the standby pressure in an uninterrupted and effective manner.

It is a further object of the invention to combine in a fluid pressure operated fluid seal, in mutually cooperative and mutually accommodating relationship a free floating element, a pressure chamber, a seal between the housing and free floating element and a standby spring pressure means, all in a novel manner, in which the parts are readily accessible for repair or replacement, in which the seal is adaptable to a maximum range of installations and in which the seal has a short overall axial length. This attribute of minimum length is a great advantage in many installations in which the space, endwise of the shaft, available for the seal is limited.

Other objects and advantages of the invention to be presently described, will be apparent from a reading of the following description and a study of the accompanying drawing of an illustrative embodiment of the invention.

In the drawing, Figure 1 is a longitudinal section of a shaft seal of this invention shown in operative relation with a centrifugal pump housing and shaft, taken along the line 1—1 of Figure 2.

Figure 2 is a left hand end view of the seal shown in Figure 1 with the pump housing removed for the sake of clarity.

In the drawings, the invention is shown as applied to a centrifugal pump, although it will be understood that the invention is applicable wherever there is need for a fluid seal between a relatively rotating shaft and a wall through which the shaft projects and which is a wall of a housing containing fluid.

A pump chamber housing or casing is indicated generally by the numeral 11, and a pump shaft by the numeral 12. The position of the shaft relative to the housing is fixed by virtue of its mounting in its bearings. These bearings (not shown) may be, and in the great majority of pump types are, of the outboard character, being located outside of, and independently of, the shaft seal and end walls of the pump housing.

A sealing means must be provided adjacent the clearance between the shaft and each end wall of the pump housing for preventing leakage of the pump fluid outwardly along the shaft through this clearance. And this seal should not, for best construction, contribute to the bearing support of the shaft. The seal, prior to the advent of seals of the general type of this invention, has been customarily, and in many instances still is, provided by annularly spacing a lateral extension of the pump housing end wall from the shaft, and installing in this spacing a stuffing box or other sealing means.

In the drawings, a cylindrical chamber 13 lies between the shaft and the longitudinally outwardly extending portion 14 of the pump housing or casing 11. This chamber corresponds to the stuffing box chamber of pumps which are sealed by packing ring glands. The shaft seal of this invention is disposed partly within the chamber 13 and partly within a chamber 15 enclosed within a cylindrical seal housing 16 extending outwardly from the pump housing 11. This seal housing 16 is formed with slotted wings 17 extending outwardly on opposite sides of the seal housing 16. The housing 16 is secured to the pump housing portion 14 or to the main body of the pump housing by means of studs 18. These studs lie in the slots of the wings 17 and the seal housing 16 is drawn into contact with the pump housing portion 14 by nuts 19 threaded on the outer ends of the studs 18, or in any other suitable manner. A fluid tight seal is effected between the seal housing 16 and the adjacent portion 14 of the pump housing by means of a sealing gasket 24.

One of the sealing elements of the invention is a collar 27 which is secured to the shaft 12 for rotation therewith by one or more set screws 28. The collar 27 is machined to closely fit the shaft 12. The escape of fluid along the cylindrical joint between the collar 27 and shaft 12 is prevented by any suitable sealing means as by an O ring 29 seated in a groove 30 formed in the collar and extending outwardly from the bore of the collar into the body thereof.

In the description and in the appended claims, the expressions "outer" and "inner," "outwardly" and "inwardly" and the like, are used with reference both to radial directions with reference to the axis of the shaft 12, and to longitudinal directions axially along the shaft with reference to the pump housing. Where the qualifying adverbs "radially" and "longitudinally" are omitted, it will be in those instances where such qualifying adverbs can be obviously omitted without uncertainty of meaning of the words "outer," "inner" and the like. Where there is any uncertainty of meaning of the expressions "inner" and "outer" and the like, the qualifying adverbs "radially" and either "longitudinally" or "axially," are used.

The outer end of the collar is preferably formed with an outwardly extending annular lip 31 at its rim surface for the mounting, with any suitable type of securement to the outer end of the collar, of an antifriction ring 32 of a material suited to the installation conditions, which material may be graphite carbon or the like material. The outer annular face of the ring 32 provides a sealing surface, the purpose of which will be explained below.

The other sealing element is a sleeve 34 which is formed preferably with a hollow cylindrical portion 35 extending outwardly along the shaft and surrounding the shaft, and is also formed with a radially outwardly extending flange 36 at the longitudinally inner end of the sleeve 34. This flange provides at its inner end a sealing surface 37 which is urged by means to be presently described into pressural contact with the antifriction ring 32. Since, as will appear presently, the sleeve 34 is held against rotation when the shaft rotates, the sealing face 33 of the antifriction ring and the sealing face 37 of the sleeve will have a rotary sliding contact preventing the escape of the fluid from the pump in the clearance chambers 13 and 15 into a clearance chamber 38 between the sleeve 34 and the shaft, and thence to the outside atmosphere.

The seal housing 16 is formed with an inwardly extending annular flange 39 by which the seal housing and the sleeve 34 are centered with respect to the pump structure. The seal housing 16 is initially manufactured with a uniform outside diameter extending without reduction to its inner end face. The seal housing is machined to provide a flange 39 of an outside diameter to fit a particular installation in which it is to be used, and this is preferably done in the field after delivery of the seal to the user.

The seal housing 16 is machined to have a bore 40 of larger diameter along an inner end portion and a bore 41 of smaller diameter along an outer end portion and an axially inwardly directed radial face 42 connecting the two bore surfaces 40 and 41. This radial face is spaced a short interval axially outwardly from the outer face of the flange 36. The void between these two faces constitutes a pressure chamber 44 and fluid under pressure may pass uninterruptedly from the pump chamber to this pressure chamber 44 through the clearance chambers 13 and 15. Since the sleeve 34 is longitudinally movable, the fluid pressure within this chamber acts to force the flange 36 inwardly against the antifriction ring 32.

There is a slight clearance between the bore surface 41 and the rim surface of the sleeve 34 and this clearance must be sealed to prevent escape of fluid pressure within the pressure chamber 44 to the outside atmosphere. This is accomplished by means of an O ring 45 seated in a groove 46 of rectangular cross-section formed in the housing 16 and extending outwardly from the bore surface 41 into the body of the housing. This O ring has an outside diameter slightly greater than the diameter of the bottom wall of the groove 46, an inside diameter substantially equal to the rim diameter of the sleeve 34, and a toroidal diameter slightly greater than the distance between the bottom wall of the groove 46 and the rim diameter of the sleeve 34 and substantially less than the width of this groove, as is standard practice in O ring seals under usual conditions. The sleeve 34 is, with this type of O ring seal, permitted to move a short interval back and forth along the shaft and may also have a limited rocking motion about the O ring as a center, which allows the inner sealing face 37 of the sleeve flange 36 to maintain flat contact with the antifriction ring. The contact pressure is thus evenly distributed over the contacting surfaces under all conditions, irrespective of the random wobble movements of the shaft, and the unit pressure between the flange and the antifriction ring is substantially constant over the contact area. The contacting face of the flange 36 is preferably of a very hard material which is lapped to be very smooth and shaped to accurately mate with the antifriction ring.

The standby spring pressure which was considered above in the discussion of the principles of operation applicable to shaft seals of this type, is provided by means which will now be described. The outer annular end of the sleeve 34 which projects somewhat beyond the outer end of the seal housing 16 is provided with a plurality of evenly annularly spaced rectangular notches 47.

A plate 48 apertured to surround the shaft and of rigid material is formed with a corresponding number of tongues 49 spaced in correspondence to the notches and shaped to engage the notches, the notches being slightly wider than the tongues to permit a slight rotative play between the ring and sleeve, with a result that while the sleeve is substantially stationary with respect to the plate, it may oscillate over a very slight arc to accommodate itself more readily to random wobble movements of the shaft.

This plate is non-rotatively secured to the housing by means of an annular row of stems 50 which are threadedly or otherwise secured to the housing at their inner ends within circular recesses 20 of the housing and which project through correspondingly spaced apertures 51 disposed in an annular row around the outer edge of the plate. The plate may be formed with enlargements 52 through which these apertures pass.

The outer ends of the stems are provided with heads 53. For each stem there is a cup 54 which is rigidly secured at its outer open end to the plate in a position surrounding the associated stem. The inner bottom or end wall of the cup is apertured to accommodate the stem, the aperture being slightly larger than the stem to permit the plate 48 to angle slightly from its normal position in which it is perpendicular to the axis of the seal structure.

A spiral spring 55 is seated within each cup under compression between the stem head 53 and the bottom wall of the cup. It is obvious that these springs urge the cups and the plate to which the cups are attached, inwardly and the plate in turn urges the sleeve 34 inwardly providing a standby force for holding the sealing elements in contact when the pump is idle or for any other reason the fluid pressure within the pressure chamber 44 is inadequate, and also at times when the sealing elements have slightly separated due to endwise surging movements of the shaft during operation of the pump.

The random free floating movements of the sleeve 34 in response to eccentric movements of the shaft may take place while at the same time it is being urged inwardly by the coiled springs 55, by reason of the loose outwardly-separable connection of the plate tongues 49 in the notches of the sleeve 34, by reason of the rotative play between the notches 47 and tongues 49, and by reason of the play between the stems 50 and the holes in the bottom or inner end walls of the cups 54. If per chance, the seal should have a leakage of fluid at the outer end of the sleeve, the spiral springs are substantially protected from any harmful effect caused by contact with the fluid, especially fluid of a corrosive nature, by the cups surrounding the springs.

While there has been herein described with particularity a specific embodiment of the invention, it will be apparent that parts may be transposed, or modified in relative dimensions or arrangement, and the structure may be otherwise changed without departing from the spirit of the invention and from the principles of its operation and without variance from the description of the novel features and relationships of the invention which are set forth in the following claims.

I claim:
1. A sealing apparatus for effecting a fluid-tight seal between a shaft and a fluid chamber opening through which the shaft extends, comprising: a collar mounted on the shaft for rotation therewith; an annular sealing surface on the collar facing outwardly in the axial direction of the shaft; a cylindrical sleeve of inside diameter greater than the shaft diameter coaxially encircling the shaft and having an annular radially extending flange about the periphery of one end of said sleeve, the end face of said flange defining a sealing surface registering with said sealing surface on the collar; a housing surrounding said sleeve and in fluid-tight engagement with the periphery of the opening in said chamber; resilient fluid-tight means between said sleeve and the housing circumferentially surrounding said sleeve at a point axially spaced outwardly from said annular flange to define an annular space between the rear face of said flange and the sealing means, said annular space being in communication with the fluid in the chamber whereby fluid pressure exerted against said rear face urges said sealing surfaces into engagement with a force substantially proportional to said fluid pressure; the other end of the periphery of the sleeve having circumferentially spaced notches; a plate member having a central opening of diameter to receive said other end of the sleeve; radially inwardly directed tongues circumferentially spaced about the inner periphery of the opening in said plate receivable in said notches, said tongues having dimensions less than the dimensions of said notches whereby small rotational movements of said sleeve with respect to said plate may be effected; and spring means radially spaced from the opening in the plate coupled between the plate and housing to urge said plate axially towards the housing with a given force, said force being transmitted to said sleeve through the tongues of the plate to urge the sleeve axially inwardly.

2. A sealing apparatus for effecting a fluid-tight seal between a shaft and a fluid chamber opening through which the shaft extends, comprising: a collar mounted on the shaft for rotation therewith; an annular sealing surface on the collar facing outwardly in the axial direction of the shaft; a cylindrical sleeve of inside diameter greater than the shaft diameter coaxially encircling the shaft and having an annular radially extending flange about the periphery of one end of said sleeve, the end face of said flange defining a sealing surface registering with said sealing surface on the collar; a housing surrounding said sleeve and in fluid-tight engagement with the periphery of the opening in said chamber; resilient fluid-tight means between said sleeve and the housing circumferentially surrounding said sleeve at a point axially spaced outwardly from said annular flange to define an annular space between the rear face of said flange and the sealing means, said annular space being in communication with the fluid in the chamber whereby fluid pressure exerted against said rear face urges said sealing surfaces into engagement with a force substantially proportional to said fluid pressure; a plate member having a central opening of diameter to receive the other end of the sleeve; means securing said other end of the sleeve to the inner periphery of the plate; at least three spring means radially spaced from the opening in the plate and annularly spaced from each other to provide equal distances between the adjacent spring means, said spring means axially forcing said plate towards the housing; stem means rigidly secured to the housing holding said spring means against the plate, said stem means being in loose engagement with the plate, whereby the plate and sleeve may freely float in any direction to follow the eccentric movements of the shaft.

References Cited in the file of this patent

UNITED STATES PATENTS

| Number | Name | Date |
|---|---|---|
| 1,900,523 | Schmierer | Mar. 7, 1933 |
| 1,927,543 | Doyle | Sept. 19, 1933 |
| 2,408,314 | Jacobsen | Sept. 24, 1946 |
| 2,419,588 | Pasco | Apr. 29, 1947 |
| 2,470,419 | Voytech | May 17, 1949 |
| 2,511,337 | Jacobsen | June 13, 1950 |
| 2,531,079 | Payne | Nov. 21, 1950 |
| 2,555,932 | Reed | June 5, 1951 |
| 2,567,809 | Greiner | Sept. 11, 1951 |